United States Patent [19]

Printy

[11] Patent Number: 4,819,957

[45] Date of Patent: Apr. 11, 1989

[54] KICKSTAND BEARING SUPPORT PAD

[76] Inventor: Richard J. Printy, R.R. #1 Box 459, Laveen, Ariz. 85339

[21] Appl. No.: 193,593

[22] Filed: May 13, 1988

[51] Int. Cl.$^4$ ............................................. B62H 1/02
[52] U.S. Cl. ................................. 280/293; 248/188.9; 248/346
[58] Field of Search ............ 248/678, 159, 176, 188.2, 248/188.5, 276, 284, 346, 346.1, 351, 354.1, 357, 188.9; 280/293, 295, 301, 304; D12/120

[56] References Cited

U.S. PATENT DOCUMENTS

| | | | |
|---|---|---|---|
| D. 241,528 | 9/1976 | Massa | D12/120 |
| 555,024 | 2/1896 | Ruffhead | 280/301 |
| 702,862 | 1/1902 | Moss | 280/304 |
| 1,746,486 | 2/1930 | Martin | 248/159 |
| 2,616,692 | 11/1952 | Bird | 248/284 |
| 2,806,416 | 9/1957 | Jones | 248/188.5 |
| 2,835,508 | 5/1958 | Wood | 248/188.9 |
| 3,712,640 | 1/1973 | Shipman | 280/301 |
| 3,955,829 | 5/1976 | Bussler | 280/293 |
| 3,970,330 | 7/1976 | Norcross | 280/301 |
| 3,998,470 | 12/1976 | Houston | 280/301 |
| 4,457,530 | 7/1984 | Johnson | 280/293 |
| 4,521,031 | 6/1985 | Huth | 280/293 |
| 4,625,987 | 12/1986 | Marsh | 280/293 |
| 4,634,144 | 1/1987 | Ringe | 248/188.9 |

FOREIGN PATENT DOCUMENTS

| | | | |
|---|---|---|---|
| 2431415 | 3/1980 | France | 280/301 |
| 411253 | 7/1945 | Italy | 280/301 |

Primary Examiner—Alvin C. Chin-Shue
Assistant Examiner—Robert A. Olson

[57] ABSTRACT

A support pad is provided for use as a bearing between a motorcycle kickstand and sand or other soft terrain. A collapsible handle is provided which is pivoted to the pad and may be extended so that the pad may be located while an operator is astride the motorcycle. The handle may also be collapsed and pivoted against the pad to provide a compact device for storage.

3 Claims, 1 Drawing Sheet

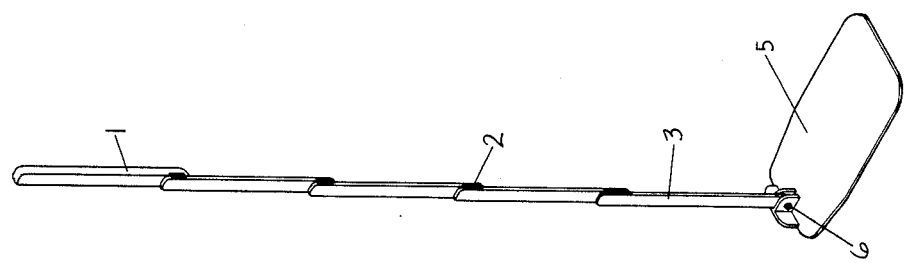
FIGURE 1
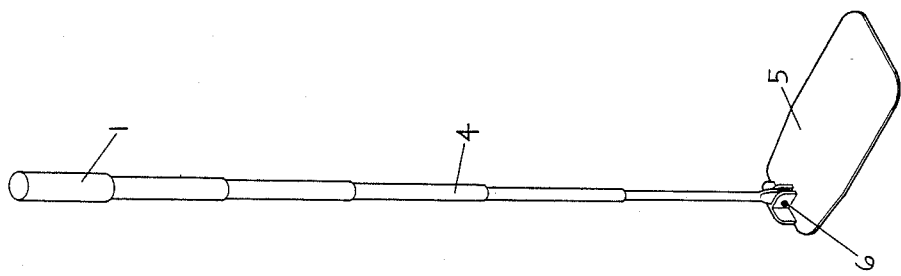
FIGURE 2
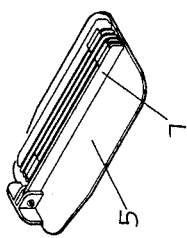
FIGURE 3
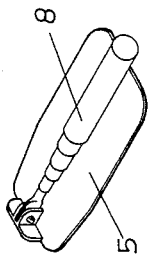
FIGURE 4
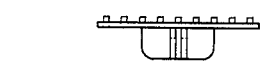
FIGURE 7
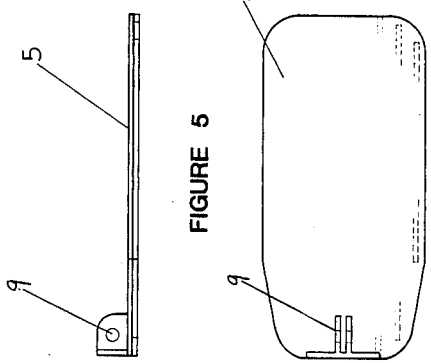
FIGURE 5
FIGURE 6

KICKSTAND BEARING SUPPORT PAD

BACKGROUND OF THE INVENTION

The invention relates to a motorcycle kickstand support used on sand or other soft terrain. A pad is placed between the sand and kickstand to provide a bearing surface wherein the cycle will remain standing.

Cycle riders have known for years that a cycle kickstand is all but useless in sand and soft terrain, the cycle being much too heavy to be supported by the small bearing surface of the normal cycle kickstand. In bad weather a cycle rider may pull over to the soft shoulder of a highway to put on his rain gear. If he can't find a can to flatten, or a piece of board to place under his kickstand, he must relay on just his kickstand for support, and when he's ready to resume his trip he may find his cycle on the ground. If it's a dress bike he may have expensive repairs and/or he may not be strong enough to right the bike.

U.S. Pat. No. 4,457,530 to Johnson describes a device that fits over the kickstand and remains in place while motoring. Most cyclists would agree that anything additional mounted that close to the ground may tend to be a safety hazard. Norcross, U.S. Pat. No. 3,970,330, Bussler, U.S. Pat. No. 3,955,829, and Marsh, U.S. Pat. No. 4,625,987, all disclose a pad or bearing surface, but lack a means to locate the pad.

SUMMARY OF THE INVENTION

Accordingly, it is an object of the present invention to provide an improved kickstand bearing support. It is a further object to provide a kickstand bearing support including a means to locate the support by the operator of a motorcycle while astride the cycle.

It is an additional object of the present invention to provide a locating means which folds from a usable size to a very compact size for storage.

BRIEF DESCRIPTION OF THE DRAWINGS

FIG. 1 is a perspective view illustrating a first embodiment of the invention which incorporates a telescoping handle;

FIG. 2 is a perspective view illustrating a second embodiment of the invention which incorporates a folding handle;

FIG. 3 is a view of the embodiment of FIG. 1, but showing the device in a collapsed state;

FIG. 4 is a view of the embodiment of FIG. 2, but showing the device in a collapsed state;

FIG. 5 is a side view of the bearing pad;

FIG. 6 is a top view of the bearing pad;

FIG. 7 is a front view of the bearing pad.

DETAILED DESCRIPTION

Reference now should be made to the drawings in which the same reference numerals are used throughout the different figures to designate the same or similar components. FIG. 1 illustrates a first embodiment of the invention including a bearing pad 5, and telescoping handle 4 with handle grip 1. The bearing pad includes a handle attaching slot 9 which has an aperture drilled in a horizontal plane through both sides of the slot. The handle is pivotably attached to the bearing pad by a shoulder bolt 6 which is passed through the aperture in the handle attaching slot 9 and through a similar aperture provided at an end of the telescoping handle 4. The bolt is attached using an acorn nut, and a threadlocking agent may be used to secure the nut to the bolt.

FIG. 1 illustrates the telescoping handle in its extended, use position, while FIG. 3 illustrates a collapsed telescoping handle 8. In the collapsed condition, the length of the handle is substantially the same as the length of the bearing pad 5. This insures ease of the storage of the device.

Referring now to FIG. 2, a second embodiment of the device is illustrated, which includes a folding handle 3. The folding handle is constructed of identical sections pivoted to each other. The top section, however, is constructed thicker so as to provide a handle grip 1, and bottom section includes an aperture to attach the handle to the pad 5 in the same manner as described above. The folding handle sections are pivotably joined by swivel fasteners 2, which fasteners may be constructed of any suitable material such as brass. FIG. 4 illustrates a collapsed folding handle 7.

The handle and pad may be constructed of a sturdy, lightweight material such as plastic, and may be manufactured by injection molding. In one operation, using a two piece die mold (not shown), all of the parts of the handle and pad, excluding the shoulder bolt and swivel fasteners, may be manufactured.

Now the operation of the device will be described. A cyclist carries the kickstand bearing support in the collapsed mode and when extra bearing surface on sand or other soft terrain is needed, the handle may be extended, and while astride the cycle, the operator places the pad between the ground and the tip of the kickstand. He then pivots the handle against the cycle. The cycle is now safely propped. When ready to depart, the operator positions the cycle to relieve pressure on the pad, then using the handle retrieves the pad, collapses the handle, pivots the handle flat on the pad, and stores the now compact device.

Various other changes and modifications may occur to those skilled in the art without departing from the scope of the invention.

I claim:

1. A kickstand support comprising a planar support pad adapted to provide support for a kickstand on soft terrain, with mounting means at an outer edge thereof and a collapsible rigid handle pivoted at one end to the mounting means and including grip means at the opposite end, said handle being comprised of two or more sections of approximately the same length which may be collapsed together to approximately the same length as said pad, and being pivotable at said mounting means to lie flat against said pad.

2. The kickstand support as defined in claim 1 wherein said collapsible handle is comprised of telescoping sections.

3. The kickstand support as defined in claim 1 wherein said collapsible handle is comprised of pivoted sections which may be foldably collapsed.

* * * * *